D. E. LYONS.
ROLLER BEARING.
APPLICATION FILED DEC. 30, 1911.
1,051,140.
Patented Jan. 21, 1913.
2 SHEETS—SHEET 1.
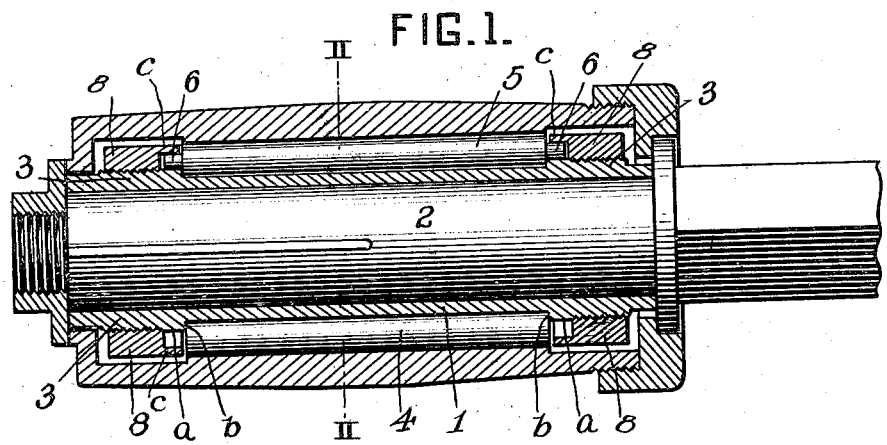
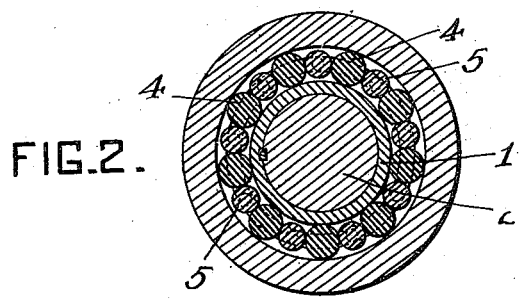
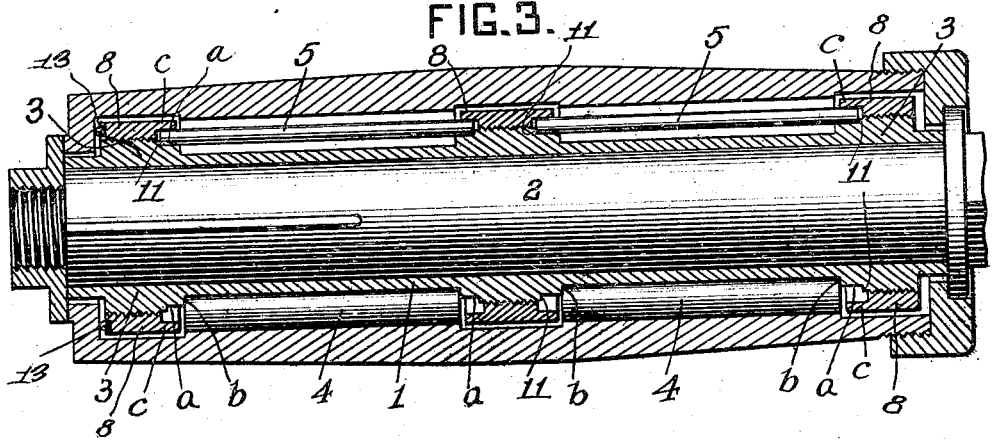
WITNESSES:
INVENTOR
David E. Lyons

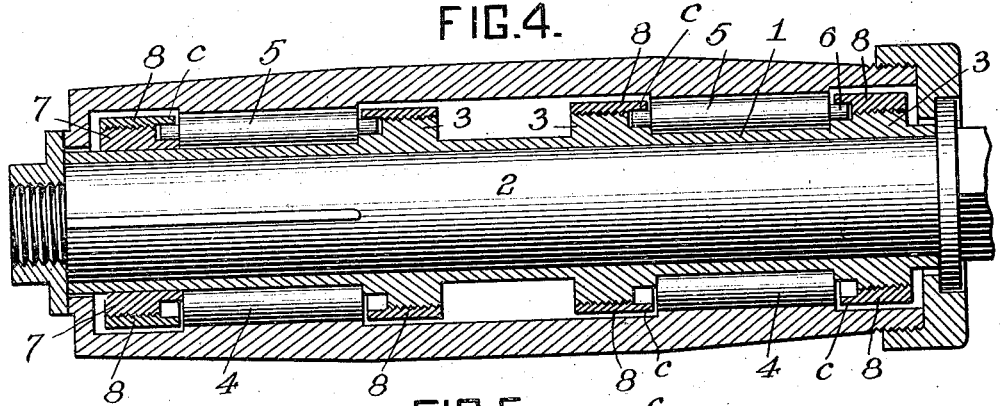
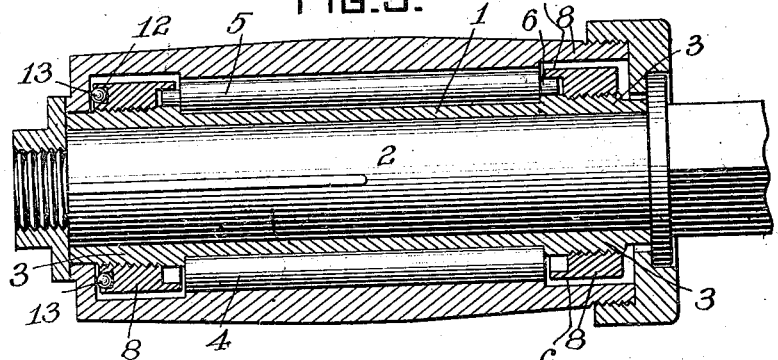
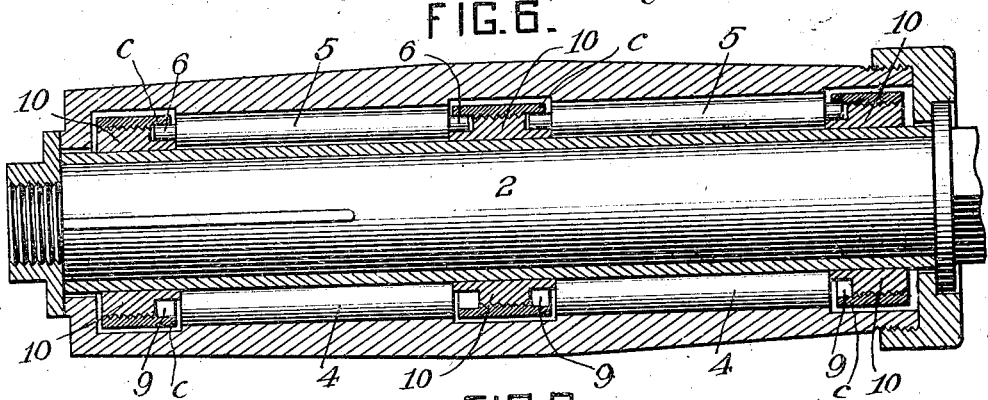
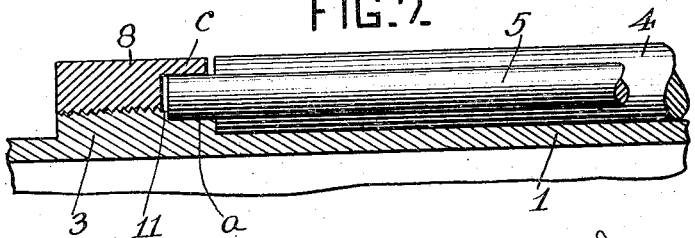

UNITED STATES PATENT OFFICE.

DAVID E. LYONS, OF LOS ANGELES, CALIFORNIA, ASSIGNOR TO DARWIN S. WOLCOTT, TRUSTEE, OF SEWICKLEY, PENNSYLVANIA.

ROLLER-BEARING.

1,051,140.

Specification of Letters Patent. Patented Jan. 21, 1913.

Application filed December 30, 1911. Serial No. 668,744.

*To all whom it may concern:*

Be it known that I, DAVID E. LYONS, residing at Los Angeles, in the county of Los Angeles and State of California, a citizen of the United States, have invented or discovered certain new and useful Improvements in Roller-Bearings, of which improvements the following is a specification.

The invention described herein relates to certain improvements in roller bearings of that class or kind in which the load supporting rollers are separated a suitable distance by spacing rollers.

The invention is hereinafter more fully described and claimed:

In the accompanying drawings forming a part of this specification Figure 1 is a sectional elevation of a roller bearing embodying my improvements; Fig. 2 is a transverse section of the bearing, the plane of section being indicated by the line II—II Fig. 1; Figs. 3, 4, 5, 6 and 7 are views similar to Fig. 1 illustrating modifications of my improvement.

In the practice of my invention it is preferred that the inner bearing member 1 should be made in the form of a sleeve fitting over and keyed or otherwise secured on shaft or supporting member 2, as the labor, time and expense of such construction is less than if the inner bearing surface should be formed directly on such shaft or supporting member. The sleeve or inner member is provided with suitably spaced collars between which the bearing or working rollers 4 are arranged. The inner ends of faces of these collars are provided with raceways for the reception of the ends or journal portions of the spacing rollers 5. The portion $a$ of the collars forming the inner wall of the raceways, are the supporting or bearing surfaces for the ends or journal portions of the spacing rollers, and the inner ends $b$ of said portions form the bearing surfaces for the ends of the working rollers to prevent material longitudinal movement of the bearing or working rollers, and also of the spacing rollers when formed with journals of less diameter than their body portion. The outer walls of the raceways are formed by flanges $c$.

The end bearing portions $b$ of the collars should be made of such a height above the surface of the sleeve, less than half the diameter of the working rollers, as to form efficient abutments to prevent longitudinal movements of the working and spacing rollers 5. The latter may be made of any desirable diameter less than that of the working rollers, consistent with the work to be performed by them. These spacing rollers may be formed with reduced end portions or journals 6, as shown, in which case the peripheral bearing surfaces $a$ of the raceways are made of such a height relative to the diameter spacing rollers, as to form bearings for these journals 6 and support the spacing rollers out of contact with the surface of the sleeve intermediate the collars. The rollers 4 and 5 and portions $a$ $b$ of the collars 3 are so proportioned that, while the rollers 4 bear on the surface of the sleeve and the rollers 5 are supported out of contact with such surface, the axes of the rollers 4 and 5 are equidistant from the axis of the sleeve, so that the spacing rollers will not have the slightest tendency to force the working rollers out or in.

It will be observed that the working and spacing rollers bear for less than half the area of their ends against the shoulders $b$ formed by the ends of the collars. This is an important feature of my improved bearing, as I have found that where these rollers have end bearings equal or approximately equal to the areas of their ends there is great tendency to heating. These collars may be formed by reducing the external diameter of the inner bearing surface intermediate of the desired location of the collars, as shown in Figs. 1, 3 and 4 or may be formed independent of the sleeve and forced into position by suitable pressure or they may be shrunk onto the sleeves, or held in position by threads. The spacing rollers are held from outward movement by means of the flanges $c$ which may be formed integral with a ring 8, adapted to be secured on the collars 3 by the threads, or they may be forced onto the collars or shrunk thereon, as shown in Fig. 3. Or the flanges $c$ may be formed integral with the collars as shown in Fig. 6. It will be observed that the flanges $c$, whether held in position by the rings 8 or integral with the collar, form in connection with portions $a$ of the collars raceways for the end or journal portions of the spacing rollers, as hereinbefore stated. These flanges $c$ whether formed on the rings or on the collars are so constructed and secured in position, that while they overlap the journals or ends of the spacing rollers, their ends will not contact with the ends of either the spacing or working rollers, if the latter bear against the bearing surfaces *b* of the collars.

As shown in Fig. 7 the spacing rollers may be made without the end journals the rollers being of the same diameter for their entire length. When so constructed their longitudinal movements will be prevented by additional shoulders 11 in the raceways back from the surfaces *b*.

Considerable difficulty is experienced in making rollers of any considerable length sufficiently true or uniformly cylindrical, and hence in case of long journals it is preferred to use two or more series of short rollers, as shown in Figs. 3 and 4. If desired one of the series may be arranged at one end of the journal and a second series at the opposite end leaving an unoccupied space between them as shown in Fig. 4. It will be understood that when using two or more series of rollers, the external diameter of the intermediate collars and the internal diameter of their rings 8, are made sufficiently greater than the diameters of the corresponding end portions that the rings may pass freely over the end collars in congregating the several parts of the bearings. The increased thickness due to the collars on the ends of the sleeves permits of the formation of a raceway 12 for the reception of balls 13 thus forming an antifriction end bearing.

I claim herein as my invention:

1. In a roller bearing the combination of a member having a cylindrical bearing surface provided with spaced collars having bearing portions parallel with the axis of the bearing surface, working rollers having lengths approximately equal to the distance between the collars, spacing rollers of less diameter than the working rollers and having their ends supported by the bearing portions of the collars the bearing portions being of such height as to support the spacing rolls with their axes the same distance as the axes of the working rollers from the axis of the bearing, and rings secured to the collars and provided with flanges extending over the ends of the spacing rollers and forming with the bearing portions of the collars raceways for the spacing rollers, the collars being provided with portions forming bearings for the ends of the spacing and working rollers of a radial height less than half the diameter of the spacing rollers.

2. In a roller bearing the combination of a member having a cylindrical bearing surface provided with spaced collars having bearing portions parallel with the axis of the bearing surface, working rollers arranged between adjacent collars, spacing rollers of less diameter than the working rollers and having their ends supported by the bearing portions of the collars, said portions being of such height as to support the spacing rollers with their axes the same distance as the axes of the working rollers from the axis of the bearing, and rings detachably secured to the collar and provided with flanges extending over the ends of the spacing rollers and forming with the bearing portions of the collar raceways for the spacing rollers, the collars being provided with portions forming bearings for the ends of the spacing and working rollers of a radial height less than half the diameter of the spacing rollers.

3. In a roller bearing the combination of a member having a cylindrical bearing surface provided with a plurality of collars having their adjacent ends adapted to form end and peripheral bearing surfaces for the working and spacing rollers respectively, the intermediate collar having a greater external diameter than the outside collars, retaining rings detachably secured to the collars and provided with flanges forming with the peripheral bearing portions of the collars annular raceways, a plurality of series of working rollers arranged between the ends of adjacent collars, and a plurality of series of spacing rollers of less diameter than the working rollers, and having their ends arranged in the raceways, the parts or elements forming the raceways being so constructed as to maintain the axes of the spacing rollers the same distance as the axes of the working rollers from the axis of the bearing.

4. In a roller bearing, the combination of a member having a cylindrical bearing surface provided with collars having raceways in their opposite ends, working rollers arranged between said collars, and spacing rollers of less diameter than the working rollers and having their ends so supported in the annular raceways that their axes are the same distance as the axes of the working rollers from the axis of the bearing, the collars being provided with portions forming bearings for the ends of the spacing and working rollers of a radial height less than half the diameter of the spacing rollers.

5. In a roller bearing, the combination of a member having a cylindrical bearing surface provided with collars having raceways in their opposite ends, one of the walls forming the raceways extending inwardly along the bearing surface beyond the other wall, working rollers arranged intermediate of the extended portions of the raceways, spacing rollers having uniform diameter for their entire length, such diameter being less than that of the working rollers and having their ends so supported in the raceways that their axes will be the same distance as the axes of the working rollers, from the axis of the bearing and shoulders within the race-ways forming end bearings for the spacing rolls, the areas of such bearings being less than that of the ends of the spacing rollers.

6. In a roller bearing the combination of a sleeve provided with spaced collars having bearing portions, one of said collars being arranged at one end of the sleeve and provided with a raceway, balls arranged in said raceway, working rollers arranged intermediate the collars, spacing rollers having diameters less than those of the working rollers and having their ends so supported by the bearing portions of the collars that their axes are the same distance as the axes of the working rollers from the axes of the bearing and retaining rings carried by the collars and having their inner ends overlapping the ends of the spacing rollers the collars being provided with portions forming bearings for the ends of the spacing and working rollers of a radial height less than half the diameter of the spacing rollers.

In testimony whereof, I have hereunto set my hand.

D. E. LYONS.

Witnesses:
    ALICE A. TRILL,
    G. G. TRILL.

---

Copies of this patent may be obtained for five cents each, by addressing the "Commissioner of Patents, Washington, D. C."